US011205822B2

United States Patent
Wu et al.

(10) Patent No.: US 11,205,822 B2
(45) Date of Patent: Dec. 21, 2021

(54) NON-POROUS SEPARATOR AND USE THEREOF

(71) Applicant: DKJ NEW ENERGY S & T CO. LTD., Shaoxing (CN)

(72) Inventors: Yuping Wu, Shaoxing (CN); Yusong Zhu, Shaoxing (CN); Jian Zheng, Shaoxing (CN)

(73) Assignee: DKJ NEW ENERGY S & T CO. LTD., Shaoxing (CN)

( * ) Notice: Subject to any disclaimer, the term of this patent is extended or adjusted under 35 U.S.C. 154(b) by 136 days.

(21) Appl. No.: 16/080,630

(22) PCT Filed: Mar. 29, 2017

(86) PCT No.: PCT/CN2017/078569
§ 371 (c)(1),
(2) Date: Aug. 28, 2018

(87) PCT Pub. No.: WO2017/167195
PCT Pub. Date: Oct. 5, 2017

(65) Prior Publication Data
US 2019/0088916 A1 Mar. 21, 2019

(30) Foreign Application Priority Data
Mar. 29, 2016 (CN) .......................... 201610187527.9

(51) Int. Cl.
| | | |
|---|---|---|
| *H01M 2/16* | (2006.01) | |
| *H01M 2/18* | (2006.01) | |
| *H01M 6/16* | (2006.01) | |
| *H01M 10/0567* | (2010.01) | |
| *H01M 10/0569* | (2010.01) | |
| *H01M 50/409* | (2021.01) | |
| *H01M 10/0565* | (2010.01) | |
| *C08L 1/28* | (2006.01) | |
| *H01M 10/0525* | (2010.01) | |
| *H01M 50/403* | (2021.01) | |
| *H01M 50/411* | (2021.01) | |
| *H01M 50/446* | (2021.01) | |
| *H01M 50/463* | (2021.01) | |

(52) U.S. Cl.
CPC ........... *H01M 50/409* (2021.01); *C08L 1/286* (2013.01); *H01M 6/164* (2013.01); *H01M 10/0525* (2013.01); *H01M 10/0565* (2013.01); *H01M 10/0567* (2013.01); *H01M 10/0569* (2013.01); *H01M 50/403* (2021.01); *H01M 50/411* (2021.01); *H01M 50/446* (2021.01); *H01M 50/463* (2021.01); *H01M 6/16* (2013.01)

(58) Field of Classification Search
CPC ........ H01M 10/0525; H01M 10/0565; H01M 10/0567; H01M 10/0569; H01M 2/145; H01M 2/16; H01M 2/1653; H01M 2/166; H01M 2/18; H01M 6/16; H01M 6/164
See application file for complete search history.

(56) References Cited

U.S. PATENT DOCUMENTS

| 5,429,891 | A | 7/1995 | Gozdz et al. | |
|---|---|---|---|---|
| 2002/0192561 | A1* | 12/2002 | Noh .................. | H01M 2/145 429/254 |
| 2005/0277026 | A1* | 12/2005 | Nishikawa ........... | H01M 2/145 429/249 |
| 2017/0162847 | A1* | 6/2017 | Choi .................. | H01M 12/08 |
| 2017/0263908 | A1* | 9/2017 | Laicer ................ | H01M 2/1686 |

FOREIGN PATENT DOCUMENTS

| CN | 101809801 | 8/2010 |
|---|---|---|
| CN | 102617881 | 8/2012 |
| CN | 103178226 | 6/2013 |
| CN | 104868156 | 8/2015 |
| CN | 105679984 | 6/2016 |

OTHER PUBLICATIONS

International Search Report issued in PCT/CN2017/078569 dated Jul. 7, 2017.

* cited by examiner

Primary Examiner — Carlos Barcena
(74) Attorney, Agent, or Firm — Kilpatrick Townsend & Sockton LLP

(57) ABSTRACT

The present invention belongs to the technical fields of macromolecular materials and batteries, and particularly relates to a non-porous separator and the use thereof, more particularly to a non-porous separator having a gelation function and the use thereof. This non-porous separator is composed of two or more macromolecular materials, wherein at least one of the macromolecular materials can be gelled by an organic solvent. This non-porous separator can be used in batteries having an organic solvent-based electrolyte and a high energy density, such that not only can a micro-short circuit, generated due to the introduction of foreign matters such as metals, be prevented, leading to an improved qualification rate for the product, but also the safety performance and the cycle life of such a battery can be improved significantly.

21 Claims, No Drawings

NON-POROUS SEPARATOR AND USE THEREOF

CROSS REFERENCE TO RELATED APPLICATIONS

This application is a U.S. National Stage of International Application No. PCT/CN2017/078569, filed Mar. 29, 2017, which claims priority to Chinese application no. 201610187527.9, filed Mar. 29, 2016, the entire contents and disclosures of which are incorporated herein by reference.

TECHNICAL FIELD

The present invention belongs to the technical fields of macromolecular materials and batteries, and particularly relates to a non-porous separator and the use thereof.

BACKGROUND OF THE RESEARCH

In order to increase the energy density of battery, an organic electrolyte is used in place of the aqueous electrolyte such that the working voltage of the battery can greatly exceed the theoretical decomposition voltage of water, i.e., 1.23 V (Yuping Wu, Lithium-Ion Batteries: Fundamentals and Applications, CRC Press—Taylor & Francis, New York, 2015). Among primary or secondary batteries that use organic electrolytes, the properties of lithium batteries are comparatively favorable at present. As a new type of chemical power source, lithium batteries have advantages such as high energy density, environmental friendliness, and having no memory effect. Since their commercialization, lithium batteries have been widely used in various portable electronic devices, such as laptops, digital cameras, mobile phones, and are also one of the ideal energy storage devices for hybrid electric vehicles (HEVs), plug-in hybrid electric vehicles (PHEVs), pure electric vehicles (EVs) and small-scale smart grids. However, the safety and reliability of the large-capacity lithium ion batteries have been questioned due to the widespread use of $LiPF_6$-based organic electrolytes (which are sensitive to moisture, flammable, and can easily cause battery explosion). Moreover, the separator used is a porous polymer selected from such material as polyethylene, polypropylene, polyphenylene sulfide (e.g., Japanese Patent Publication No. JP2000344325, Inventors: Lundquist Joseph T et al., entitled "Lithium battery", filed on May 15, 1986; U.S. Application with Publication No. US20000546266, Inventor: Zhang Zhengming, entitled "Separator for a high energy rechargeable lithium battery", filed on Apr. 10, 2000; Chinese Application with Publication No. CN201510240715.9, Inventors: Wang Luoxin et al., entitled "Melt-blowing polyphenylene sulphide non-woven fabric lithium battery separator and preparation method thereof", filed on May 13, 2015), and the porosity of these classic separators must exceed 30% so as to obtain better electrochemical performance, thus even if the surface is coated with ceramic (Chinese Application with Publication No. CN201410445356.6, Inventors: Wu Shuqiu et al., entitled "Ceramic-gel polymer multilayer composite lithium battery separator and preparation method thereof", filed on Sep. 2, 2014; Chinese Application for Invention, Inventors: Wu Bolin, Xu Jing, Bai Shouping, entitled "A composite separator for lithium battery and its preparation method and a lithium battery comprising the same", filed on Jul. 17, 2012; German Application with Publication No. DE201110105956, Inventor: Daimler A, entitled "Method for manufacturing ceramic separator for lithium ion battery, involves providing the water-repelling substance on the surface of ceramic particles of separator", filed on Jun. 29, 2011; U.S. Application with Publication No. US20090620150, Inventors: Kim Dong et al., entitled "Method for preparing cross-linked ceramic-coated separator containing ionic polymer, ceramic-coated separator prepared by the method, and lithium secondary battery using the same", filed on Nov. 17, 2009), if a small amount of foreign matters such as metal is introduced, the problem of micro-short circuit still cannot be solved since there is still a large number of pore structures therein, which often leads to a large recall of lithium batteries. For example, Toshiba Computer Network (Shanghai) Co., Ltd. has recalled some of the Toshiba laptop batteries imported from Japan since Jan. 28, 2016 because an improper material (iron) has been mixed into the active material for electrode, and may cause a micro-short circuit during the charging and discharging of the battery.

In order to solve the safety problem of the conventional lithium ion batteries, the use of a plasticizer-incorporated gel (gel polymer electrolytes, GPEs) was later discovered. Gel polymer electrolytes have the dual properties of solid and liquid electrolytes, a conductivity that is comparable to that of an organic liquid electrolyte, together with wide electrochemical window and good thermal stability, thus have attracted much attention (e.g., U.S. Application with Publication No. U.S. Pat. No. 5,418,091-A, Inventors: Gozdz A S, Schmutz C N, Tarascon J, Warren P C, entitled "Separator membrane for electrolytic cell-comprising polymeric material and plasticizer", filed on May 2, 1995; Chinese Patent for Invention No. ZL 200710038632.7, Inventors: Zhang Peng, Zhang Hanping, Li Zhaohui, Wu Yuping, entitled "An organic-inorganic composite polymer electrolyte and a preparation method and application thereof", granted on May 19, 2010). However, the main matrix of the gel polymer electrolyte is also a porous macromolecular membrane material, such as polyethylene, polypropylene, polyvinylidene fluoride, poly(vinylidene fluoride-hexafluoropropylene). On one hand, these porous macromolecular membrane materials still cannot solve the problem of micro-short circuit in the battery caused by the introduction of foreign matters such as metal powders, and on the other hand, even if they are compounded with fillers or other macromolecular materials (Chinese Patent for Invention No. ZL 200710041166.8, inventor: Zhang Peng, Zhang Harming, Li Zhaohui, Wu Yuping, entitled "An organic-inorganic composite polymer with microporous structure, its preparing method and use", granted on Jun. 3, 2009; Chinese Application for Invention, Inventors: Mao Wei, Zhenxing, Wang Fang, entitled "A preparation method for PVDF-PAM (Polyvinylidene Fluoride-Polyacrylamide) polymer lithium battery separator", filed on Apr. 10, 2015), their mechanical strength is still low, which prevents them from being used in a large scale in batteries, such as lithium batteries.

Since the advent of batteries, the later used paper, glass fiber mats, nonwovens, and the like are all porous, with the exception of using paste as the separator at the very beginning. Lithium batteries have never used non-porous materials as separators since its advent in the 1970s. After a long period of research, we invented this patent.

CONTENT OF THE INVENTION

The object of the present invention is not only to solve the problem of micro-short circuit and the shortcoming of poor safety that cannot be solved by the existing porous separators, but also to solve the problem of micro-short circuit and the shortcoming of low mechanical strength that cannot be solved by the gel polymer electrolytes, and the object is achieved by combining two or more macromolecular materials as a matrix to provide a non-porous separator having a function of gelling. Said separator can avoid the micro-short circuit of batteries and greatly improve the qualification rate of the batteries.

Another object of the present invention is to provide the use of the above non-porous separator in a primary or secondary battery. The non-porous separator contains macromolecular materials that are gellable by an organic solvent in the electrolytic solution, and form a gel polymer electrolyte upon the addition of the electrolytic solution, thus the prepared primary or secondary battery can be significantly improved in terms of high temperature, low temperature, and cycling life.

The non-porous separator of the present invention comprises two or more macromolecular materials, and at least one of the macromolecular materials can be gelled by an organic solvent; and the two or more macromolecular materials refer to any mixture of molecular, nanometer or micron scale.

In the non-porous separator of the present invention, the macromolecular material that can be gelled by an organic solvent is a synthetic macromolecular compound or a natural macromolecular compound, or a blend, copolymer, modified product and complex of a synthetic macromolecular compound and a natural macromolecular compound.

In the non-porous separator of the present invention, the synthetic macromolecular material is one member or a blend, copolymer, modified product and complex of two and more members selected from the group consisting of polyethers, polysiloxane, polyester, polyacrylonitrile, fluoropolymer, polymers of acrylic acid and its esters, polyvinyl chloride, polyvinyl acetate, phenolic resin, epoxy resin, polyurethane, polyarenes, polyamide, and polyimide.

In the non-porous separator of the present invention, the synthetic macromolecular material further comprise fillers and additives, and the weight proportion of the fillers and additives is 0.01 wt. % to 20 wt. % of the synthetic macromolecular material.

In the non-porous separator of the present invention, the weight proportion of the fillers and additives is preferably 1 wt. % to 5 wt. % of the synthetic macromolecular material.

In the non-porous separator of the present invention, the natural macromolecular material is one member or a blend, modified product and complex of two and more members selected from the group consisting of cellulose, starch, chitin, chitosan, collagen, gelatin, natural silk, and spider silk.

In the non-porous separator of the present invention, said modified product of the natural macromolecular material is one member or a mixture of two and more members selected from the group consisting of their alkylates, carboxylates, sulfonated compounds, carboxymethyl compounds, grafted compounds, and crosslinked compounds.

In the non-porous separator of the present invention, the natural macromolecular material further comprise fillers and additives, and the weight proportion of the fillers and additives is 0.01 wt. % to 20 wt. % of the natural macromolecular material.

In the non-porous separator of the present invention, the weight proportion of the fillers and additives is preferably 1 wt. % to 5 wt. % of the natural macromolecular material.

In the non-porous separator of the present invention, the fillers and additives comprise one member or a mixture of two and more members selected from the group consisting of alumina, silica, titania, zirconia, compounds composed of $aLi_2O$-$bAl_2O_3$-$cTiO_2$-$dP_2O_5$ (where a, b, c, d are between 1 and 100), compounds composed of $aLi_2O$-$bLa_2O_3$-$cZrO_2$-$dTa_2O_5$ (where a, b, c, d are between 1 and 100), compounds composed of $aLi_2S$-$bSiS_2$-$cP_2S_5$ (where a, b, c are between 1 and 100), montmorillonite, and molecular sieves.

The non-porous separator of the present invention further comprises at least one macromolecular material (hereinafter referred to as a matrix) that cannot be gelled by an organic solvent. The matrix can be any macromolecular material that cannot be gelled by organic solvents, such as polyolefin, e.g., polypropylene, polyethylene, polypropylene or combinations thereof, especially polypropylene, polypropylene/polyethylene/polypropylene; polyesters, e.g., polyethylene terephthalate, polybutylene terephthalate, especially polyethylene terephthalate; polyimide; polyvinylidene fluoride; poly(vinylidene fluoride-hexafluoropropylene). The matrix can be in the form of a membrane or a fiber cloth. The matrix can be porous.

In the non-porous separator of the present invention, the content of the matrix is 38.46-64.77 wt. %, based on the total weight of the separator.

For the purposes of the present invention, the organic solvent is any organic solvent that can be used in a battery electrolyte.

In the non-porous separator of the present invention, the thickness of the non-porous separator is 1-200 μm.

In the non-porous separator of the present invention, the thickness of the non-porous separator is preferably 5-40 μm.

In the present invention, "non-porous" means that the gas permeability of the separator is found to be 0 ml/min, as detected by gas permeability test (where the area of the separator is 10 cm$^2$, the gas pressure difference between the two sides is 1 atm, and the time is 10 minutes).

The present invention further relates to a process for preparing a non-porous separator comprising two or more macromolecular materials, wherein at least one of the macromolecular materials can be gelled by an organic solvent, and at least one of the macromolecular materials cannot be gelled by an organic solvent—i.e., matrix. The process comprises dissolving the macromolecular materials that can be gelled by an organic solvent in a solvent, thereby forming a solution; immersing the matrix into the solution, evaporating the solvent, allowing the macromolecular materials that can be gelled by an organic solvent to be precipitated from the solution and deposited on the matrix. The solvent may be any solvent capable of dissolving the macromolecular materials that can be gelled by an organic solvent, such as acetone, N,N-dimethylformamide, butyl acetate, water, acetonitrile and the like.

When it is desirable to add fillers and additives, the fillers and additives may be incorporated into the solution and deposited on the matrix together with the macromolecular materials that can be gelled by an organic solvent. The fillers and additives are those as described above.

The present invention further relates to the use of the non-porous separator of the present invention as a separator for primary or secondary batteries that employ an organic solvent type electrolyte.

When the non-porous separator of the present invention is used in a primary or secondary battery, the macromolecular material that can be gelled by an organic solvent in the separator is gelled by the organic solvent in the battery, thus allowing the conductive ions to pass through the separator.

The invention further relates to a battery comprising the non-porous separator of the invention. The present invention employs a non-porous separator composed of at least two macromolecular materials. Due to the absence of the pores of the classical separators and the gel separators, this non-porous separator can avoid the micro-short circuit caused by the foreign matters such as metals, and improve the product qualification rate of high energy density batteries in a large scale. Moreover, the non-porous separator contains macromolecular materials that can be gelled by an organic solvent, thus the batteries prepared exhibit good safety and cycle performance.

SPECIFIC EMBODIMENTS

In order to better illustrate the present invention, the present invention will be further described below with reference to specific examples, but shall not be limited to the following examples.

Example 1

A polypropylene membrane with a thickness of 15 μm and a porosity of 60% was put into a 10 wt. % polyvinylidene fluoride solution in acetone and heated to 30° C. The acetone was continuously evaporated, and the polyvinylidene fluoride was precipitated from the solution, and filled into the pores of polypropylene. Thus, a separator comprising polypropylene and polyvinylidene fluoride in a weight ratio of 39:61 was obtained. The gas permeability was found to be 0 ml/min, as detected by gas permeability test (where the area of the separator was 10 $cm^2$, the gas pressure difference between the two sides was 1 atm, and the time was 10 minutes), no obvious pore structure was found when observed with a scanning electron microscope, and the thickness was 15 μm as detected with a spiral micrometer. This shows that the separator is non-porous.

A mixture of $LiFePO_4$, a conductive carbon black and a binder PVDF (in a weight ratio of 9:0.4:0.6) was used as the positive electrode, on the surface of which three iron microspheres having a particle size of 0.1 mm were fixed per ampere-hour; a mixture of an artificial graphite (Shanghai Shanshan Co., Ltd., CMS), a conductive carbon black and a binder PVDF (in a weight ratio of 9:0.4:0.6) was used as the negative electrode; LB-315 (Guotai Huarong Chemical Co., Ltd., Zhangjiagang City, Jiangsu Province, China) was used as the electrolyte; and the above non-porous separator was used as the separator. The positive electrode, negative electrode, electrolyte and separator were rolled up in accordance with a conventional method into a lithium ion battery. The batteries were subjected to formation and then capacity grading to determine the qualification rate of the batteries. Afterwards, charge and discharge cycles were performed at a discharge depth of 100% between 2.5-4.0V at 1 C, the changes in the appearance and the capacity of the batteries after 2000 cycles were observed. Some of the data are shown in Table 1.

Comparative Example 1

The conditions were as same as those in Example 1, except that the material used as the separator was polypropylene having a thickness of 13-18 μm, a porosity of 40%, and a pore size of 0.1-0.3 μm. Then the relevant performances of the batteries were measured according to the method as described in Example 1, and the relevant data are summarized in Table 1.

Example 2

A polypropylene/polyethylene/polypropylene composite membrane with a thickness of 30 μm and a porosity of 50% was put into a 10 wt. % polyacrylonitrile solution in N,N-dimethylformamide and heated to 100° C. The N,N-dimethylformamide was continuously evaporated, and the polyacrylonitrile was precipitated from the solution, and filled into the pores of polypropylene/polyethylene/polypropylene. Thus, a separator comprising polypropylene/polyethylene/polypropylene and polyacrylonitrile in a weight ratio of 49:51 was obtained. The gas permeability was found to be 0 ml/min, as detected by gas permeability test (the same method as in Example 1), no obvious pore structure was found when observed with a scanning electron microscope, and the thickness was 31 μm as detected with a spiral micrometer. This shows that the separator is non-porous.

A mixture of a high pressure $LiCoO_2$ (Hunan Shanshan Co., Ltd., LC800S), a conductive carbon black and a binder PVDF (in weight ratio of 9:0.4:0.6) was used as the positive electrode, on the surface of which three iron microspheres having a particle size of 0.1 mm were fixed per ampere-hour; a mixture of a modified natural graphite (Shanghai Shanshan Co., Ltd., LA1), a conductive carbon black and a binder PVDF (in a weight ratio of 9:0.3:0.7) was used as the negative electrode; LB-315 (Guotai Huarong Chemical Co., Ltd., Zhangjiagang City, Jiangsu Province, China) was used as the electrolyte; and the above non-porous separator was used as the separator. The positive electrode, negative electrode, electrolyte and separator were rolled up in accordance with a conventional method into a square lithium ion battery. The batteries were subjected to formation and then capacity grading to determine the qualification rate of the batteries. Afterwards, charge and discharge cycles were performed at a discharge depth of 100% between 2.5-4.40V at 1 C, the changes in the appearance and the capacity of the batteries after 500 cycles were observed. Some of the data are shown in Table 1.

Comparative Example 2

The conditions were as same as those in Example 2, except that the material used as the separator was polypropylene having a thickness of 28-32 μm, a porosity of 43%, a pore size of 0.1-0.3 μm, and both sides thereof were coated with a composite film of $SiO_2$ with a thickness of about 2 microns and a particle size of 100 nm. Then the relevant performances of the batteries were measured according to the method as described in Example 1, and the relevant data are summarized in Table 1.

Example 3

A polyethylene terephthalate membrane with a thickness of 20 μm and a porosity of 45% was put into a 20 wt. % polyvinyl acetate solution in butyl acetate containing 5 wt. % of uniformly dispersed $TiO_2$ having a particle size of 50 nm, and heated to 70° C., The butyl acetate was continuously evaporated, and the $TiO_2$-containing polyvinyl acetate was precipitated from the solution, and filled into the pores of polyethylene terephthalate. Thus, a separator comprising polyethylene terephthalate, polyvinyl acetate and $TiO_2$ in a weight ratio of 46:44:11 was obtained. The gas permeability was found to be 0 ml/min, as detected by gas permeability test (the same method as in Example 1), no obvious pore structure was found when observed with a scanning electron microscope, and the thickness was 20 μm as detected with a spiral micrometer. This shows that the separator is non-porous.

A mixture of a high pressure $LiCoO_2$ (Hunan Shanshan Co., Ltd., LC800S), a conductive carbon black and a binder PVDF (in a weight ratio of 9:0.4:0.6) was used as the positive electrode, on the surface of which three iron microspheres having a particle size of 0.1 mm were fixed per ampere-hour; a mixture of a modified natural graphite (Shanghai Shanshan Co., Ltd., LA1), a conductive carbon black and a binder PVDF (in a weight ratio of 9:0.3:0.7) was used as the negative electrode; LB-315 (Guotai Huarong Chemical Co., Ltd., Zhangjiagang City, Jiangsu Province, China) was used as the electrolyte; and the above non-porous separator was used as the separator. The positive electrode, negative electrode, electrolyte and separator were rolled up in accordance with a conventional method into a lithium ion battery packaged with a laminated aluminum foil. The batteries were subjected to formation and then capacity grading to determine the qualification rate of the batteries. Afterwards, charge and discharge cycles were performed at a discharge depth of 100% between 2.5-4.40V at 1 C, the changes in the appearance and the capacity of the batteries after 500 cycles were observed. Some of the data are shown in Table 1.

Comparative Example 3

The conditions were as same as those in Example 3, except that the material used as the separator was a three-layered structure of polypropylene/polyethylene/polypropylene having a thickness of 18-22 μm, a porosity of 38%, and a pore size of 0.1-0.3 μm. Then the relevant performances of the batteries were measured according to the method as described in Example 3, and the relevant data are summarized in Table 1.

Example 4

A polyimide fiber cloth with a thickness of 50 μm and a diameter of 200 nm was put into a 2 wt. % aqueous solution of carboxymethyl cellulose containing 0.4 wt. % of uniformly dispersed $20Li_2O-19Al_2O_3-SiO_2-30P_2O_5-25TiO_2-3GeO_2$ having a particle size of 50 nm, and heated to 80° C.

The water was continuously evaporated, and the carboxymethyl cellulose containing $20Li_2O-19Al_2O_3-SiO_2-30P_2O_5-25TiO_2-3GeO_2$ was precipitated from the solution, and filled into the pores of the polyimide fiber cloth. Thus, a separator comprising a polyimide fiber cloth, carboxymethyl cellulose and $20Li_2O-19Al_2O_3-SiO_2-30P_2O_5-25TiO_2-3GeO_2$ in a weight ratio of 30:40:8 was obtained. The gas permeability was found to be 0 ml/min, as detected by gas permeability test (the same method as in Example 1), no obvious pore structure was found when observed with a scanning electron microscope, and the thickness was 20 μm as detected with a spiral micrometer. This shows that the separator is non-porous.

A mixture of $Li_{1.05}Ni_{0.8}Co_{0.1}Mn_{0.1}O_2$, a conductive carbon black and a binder PVDF (in a weight ratio of 9:0.4:0.6) was used as the positive electrode, on the surface of which three iron microspheres having a particle size of 0.1 mm were fixed per ampere-hour; a mixture of an artificial graphite (Shanghai Shanshan Co., Ltd., CMS), a conductive carbon black and a binder PVDF (in a weight ratio of 9:0.3:0.7) was used as the negative electrode; LB-315 (Guotai Huarong Chemical Co., Ltd., Zhangjiagang City, Jiangsu Province, China) was used as the electrolyte; and the above non-porous separator was used as the separator. The positive electrode, negative electrode, electrolyte and separator were rolled up in accordance with a conventional method into a square lithium ion battery packaged with a metal aluminum shell. The batteries were subjected to formation and then capacity grading to determine the qualification rate of the batteries. Afterwards, charge and discharge cycles were performed at a discharge depth of 100% between 2.5-4.40V at 1 C, the changes in the appearance and the capacity of the batteries after 1000 cycles were observed. Some of the data are shown in Table 1.

Comparative Example 4

The conditions were as same as those in Example 4, except that the separator used had a thickness of about 50 μm, a porosity of 55%, a pore size of 0.1-0.3 μm, with the middle material being a three-layered structure of polypropylene/polyethylene/polypropylene, and both sides thereof were coated with a polyvinylidene fluoride porous membrane having a thickness of about 5 microns, wherein the polyvinylidene fluoride porous membrane contains $Al_2O_3$ with a mass ratio of 3 wt. % and a particle size of 60 nm. Then the relevant performances of the batteries were measured according to the method as described in Example 4, and the relevant data are summarized in Table 1.

Example 5

A polyvinylidene fluoride membrane with a thickness of 30 μm, a porosity of 35% and an average pore diameter of 400 nm was put into a 20 wt. % polyacrylonitrile solution in acetonitrile containing 0.2 wt. % of uniformly dispersed $Li_2S-3SiS_2-5P_2S_5$ having a particle size of 50 nm, and heated to 120° C. The acetonitrile was continuously evaporated, and the $Li_2S-3SiS_2-5P_2S_5$-containing polyacrylonitrile was precipitated from the solution, and filled into the pores of polyvinylidene fluoride. Thus, a separator comprising a polyvinylidene fluoride membrane, polyacrylonitrile and $Li_2S-3SiS_2-5P_2S_5$ in a weight ratio of 65:35:0.35 was obtained. The gas permeability was found to be 0 ml/min, as detected by gas permeability test (the same method as in Example 1), no obvious pore structure was found when observed with a scanning electron microscope, and the thickness was 30 μm as detected with a spiral micrometer. This shows that the separator is non-porous.

A mixture of $Li_{1.05}Mn_{0.98}Co_{0.02}O_2$, a conductive carbon black and a binder PVDF (in a weight ratio of 92:4:4) was used as the positive electrode, on the surface of which three iron microspheres having a particle size of 0.1 mm were fixed per ampere-hour; a mixture of an artificial graphite (Shanghai Shanshan Co., Ltd., CMS), a conductive carbon black and a binder PVDF (in a weight ratio of 9:0.3:0.7) was used as the negative electrode; LB-315 (Guotai Huarong Chemical Co., Ltd., Zhangjiagang City, Jiangsu Province, China) was used as the electrolyte; and the above non-porous separator was used as the separator. The positive electrode, negative electrode, electrolyte and separator were rolled up in accordance with a conventional method into a square lithium ion battery packaged with a laminated aluminum foil. The batteries were subjected to formation and then capacity grading to determine the qualification rate of the batteries. Afterwards, charge and discharge cycles were performed at a discharge depth of 100% between 2.5-4.20V at 1 C, the changes in the appearance and the capacity of the batteries after 500 cycles were observed. Some of the data are shown in Table 1.

Comparative Example 5

The conditions were as same as those in Example 5, except that the separated used was a polyvinylidene fluoride porous membrane having a thickness of about 30 μm, a porosity of 35%, and an average pore diameter of 400 nm. Then the relevant performances of the batteries were measured according to the method as described in Example 5, and the relevant data are summarized in Table 1.

TABLE 1

Electrochemical performance testing results of Examples 1-5 and Comparative Examples 1-5

| | Battery qualification rate (%) | Thickness change in the qualified batteries after cycles (%) | Capacity retention rate in the qualified batteries after cycles (%) |
|---|---|---|---|
| Example 1 | 100 | 3.2 (2000 cycles) | 92 (2000 cycles) |
| Comparative example 1 | 52 | 36 (2000 cycles) | 65 (2000 cycles) |
| Example 2 | 100 | 4.3 (500 cycles) | 86 (500 cycles) |
| Comparative example 2 | 38 | 42 (500 cycles) | 43 (500 cycles) |
| Example 3 | 100 | 4.2 (500 cycles) | 87 (500 cycles) |
| Comparative example 3 | 39 | 40 (500 cycles) | 46 (500 cycles) |
| Example 4 | 100 | 6.1 (1000 cycles) | 83 (1000 cycles) |
| Comparative example 4 | 61 | 13.2 (1000 cycles) | 71 (1000 cycles) |
| Example 5 | 100 | 2.1 (500 cycles) | 88 (1000 cycles) |
| Comparative example 5 | 31 | 9.3 (1000 cycles) | 61 (1000 cycles) |

The comparison between the Examples and Comparative examples with regard to the preparation of lithium ion batteries shows that when used in high energy density batteries, the non-porous separator employed by the present invention not only prevents the micro-short circuit of the batteries and yields a high qualification rate of the battery products, but also results in products having a long cycle life and a small volume change.

The non-porous separator of the present invention is mainly used as a separator for a primary or secondary battery that employs an organic solvent type electrolyte. The negative electrode of the battery is an alkali metal, an alloy of alkali metal, a carboneous material, tin, an alloy of tin, silicon or an alloy of silicon, the positive electrode is $MNO_2$ (M=one of Li, Na, K, or two or more elements thereof, N=one of Co, Ni, Mn, Co, or two or more elements thereof), $MN'PO_4$ (N=one of Fe, Mn, Co, or two or more elements thereof) or their dopants or covering materials.

The invention claimed is:

1. A non-porous separator, characterized in that the non-porous separator comprises two or more separate macromolecular materials, wherein at least one of the macromolecular materials can be gelled by an organic solvent; the two or more macromolecular materials refer to any mixture of molecular, nanometer or micron scales; the separator is non-porous, and has a gas permeability of 0 ml/min.

2. The non-porous separator according to claim 1, characterized in that the macromolecular material that can be gelled by an organic solvent is a synthetic macromolecular compound or a natural macromolecular compound, or a blend, copolymer, modified product and complex of a synthetic macromolecular compound and a natural macromolecular compound.

3. The non-porous separator according to claim 2, characterized in that the synthetic macromolecular material is one member or a blend, copolymer, modified product and complex of two and more members selected from the group consisting of polyethers, polysiloxane, polyester, polyacrylonitrile, fluoropolymer, polymers of acrylic acid and its esters, polyvinyl chloride, polyvinyl acetate, phenolic resin, epoxy resin, polyurethane, polyarenes, polyamide, and polyimide.

4. The non-porous separator according to claim 2, characterized in that the synthetic macromolecular material further comprise fillers and additives, and the weight proportion of the fillers and additives is 0.01 wt. % to 20 wt. % of the synthetic macromolecular material.

5. The non-porous separator according to claim 4, characterized in that the weight proportion of the fillers and additives is 1 wt. % to 5 wt. % of the synthetic macromolecular material.

6. The non-porous separator according to claim 4, characterized in that the fillers and additives comprise one member or a mixture of two and more members selected from the group consisting of alumina, silica, titania, zirconia, compounds composed of $aLi_2O$-$bAl_2O_3$-$cTiO_2$-$dP_2O_5$ (where a, b, c, d are between 1 and 100), compounds composed of $aLi_2O$-$bLa_2O_3$-$cZrO_2$-$dTa_2O_5$ (where a, b, c, d are between 1 and 100), compounds composed of $aLi_2S$-$bSiS_2$-$cP_2S_5$ (where a, b, c are between 1 and 100), montmorillonite, and molecular sieves.

7. The non-porous separator according to claim 2, characterized in that the natural macromolecular material is one member or a blend, modified product and complex of two and more members selected from the group consisting of cellulose, starch, chitin, chitosan, collagen, gelatin, natural silk, and spider silk.

8. The non-porous separator according to claim 7, characterized in that the modified product of the natural macromolecular material is one member or a mixture of two and more members selected from the group consisting of their alkylates, carboxylates, sulfonated compounds, carboxymethyl compounds, grafted compounds, and crosslinked compounds.

9. The non-porous separator according to claim 7, characterized in that the natural macromolecular material further comprise fillers and additives, and the weight proportion of the fillers and additives is 0.01 wt. % to 20 wt. % of the natural macromolecular material.

10. The non-porous separator according to claim 9, characterized in that the weight proportion of the fillers and additives is 1 wt. % to 5 wt. % of the natural macromolecular material.

11. The non-porous separator according to claim 1, characterized in that the thickness of the non-porous separator is 1-200 μm.

12. The non-porous separator according to claim 11, characterized in that the thickness of the non-porous separator is 5-40 μm.

13. The non-porous separator according to claim 1, characterized in that the non-porous separator further comprises, as matrix, at least one macromolecular material that cannot be gelled by an organic solvent.

14. The non-porous separator according to claim 13, characterized in that the matrix is polyolefin; polyesters; polyimide; or polyvinylidene fluoride.

15. The non-porous separator according to claim 14, characterized in that the polyesters is polyethylene terephthalate or polybutylene terephthalate.

16. The non-porous separator according to claim 15, characterized in that the polyesters is polyethylene terephthalate.

17. The non-porous separator according to claim 14, characterized in that the polyolefin is polyethylene, polypropylene or combinations thereof.

18. The non-porous separator according to claim 17, characterized in that the polyolefin is polypropylene or polypropylene/polyethylene/polypropylene.

19. Use of the non-porous separator according to claim 1, as a separator for primary or secondary batteries that employ an organic solvent type electrolyte.

20. A battery comprising the non-porous separator according to claim 1.

21. A process for preparing a non-porous separator comprising two or more macromolecular materials, wherein at least one of the macromolecular materials can be gelled by an organic solvent, and at least one of the macromolecular materials cannot be gelled by an organic solvent, that is, a matrix; wherein the process comprises dissolving the macromolecular materials that can be gelled by an organic solvent in a solvent, thereby forming a solution; immersing the matrix into the solution, evaporating the solvent, allowing the macromolecular materials that can be gelled by an organic solvent to be precipitated from the solution and deposited on the matrix;

wherein the separator is non-porous, and has a gas permeability of 0 ml/min.

* * * * *